United States Patent
Haniya et al.

(10) Patent No.: US 7,836,789 B2
(45) Date of Patent: Nov. 23, 2010

(54) INDUSTRIAL ROBOT

(75) Inventors: Kazuhiro Haniya, Fukuoka (JP);
Atsushi Ichibangase, Fukuoka (JP);
Koichi Yamaguchi, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 765 days.

(21) Appl. No.: 10/493,139

(22) PCT Filed: Oct. 22, 2002

(86) PCT No.: PCT/IB02/04355

§ 371 (c)(1),
(2), (4) Date: Apr. 20, 2004

(87) PCT Pub. No.: WO03/035337

PCT Pub. Date: May 1, 2003

(65) Prior Publication Data

US 2004/0261562 A1 Dec. 30, 2004

(30) Foreign Application Priority Data

Oct. 22, 2001 (JP) .............................. 2001-324098
Feb. 14, 2002 (JP) .............................. 2002-037386

(51) Int. Cl.
*B25J 17/00* (2006.01)
*B25J 18/00* (2006.01)
(52) U.S. Cl. ..................... 74/490.06; 74/490.03; 901/27
(58) Field of Classification Search ............. 74/490.03, 74/490.05, 490.06; 901/36, 38, 41, 42, 43
See application file for complete search history.

(56) References Cited

U.S. PATENT DOCUMENTS

| 4,624,621 | A | * | 11/1986 | Murakami et al. | ........... 414/735 |
| 4,705,243 | A | * | 11/1987 | Hartmann et al. | ............. 248/51 |
| 5,429,682 | A | * | 7/1995 | Harlow et al. | ............... 118/681 |
| 5,645,884 | A | * | 7/1997 | Harlow et al. | .................. 427/8 |
| 5,881,604 | A | * | 3/1999 | Miwa | ...................... 74/490.05 |

(Continued)

FOREIGN PATENT DOCUMENTS

EP          1 243 384 A1     9/2002

(Continued)

OTHER PUBLICATIONS

Japanese Office Action date Apr. 23, 2008.

*Primary Examiner*—Thomas R Hannon
*Assistant Examiner*—Justin Krause
(74) *Attorney, Agent, or Firm*—Sughrue Mion, PLLC

(57) ABSTRACT

The present invention provides an industrial robot, wherein a cable or the like spanned between an end effector and an upper arm has less bending due to a motion of a wrist portion, wherein the cable or the like does not twine around the upper arm, and wherein the cable or the like does not interfere with a peripheral device.

A passage opening 25, through which a cable or the like 12 for supplying power, signals or materials to an end effector 9 attached to a rotating element 7 is drawn out of a body 6, is opened at a position, at which the body 6 intersects with a center of a first axis (an R-axis). The cable or the like 12 drawn out of the passage opening 25 is extended to the end effector 9.

8 Claims, 8 Drawing Sheets

U.S. PATENT DOCUMENTS 5,890,656 A * 4/1999 Fuhlbrigge ............... 239/227
6,696,810 B2 * 2/2004 Uematsu et al. ........ 318/568.21

FOREIGN PATENT DOCUMENTS

| JP | A1 55-108617 | 7/1980 |
| JP | A1 56-28113 | 3/1981 |
| JP | 62-44390 A | 2/1987 |
| JP | 3-281190 A | 12/1991 |
| JP | 4-105888 A | 4/1992 |
| JP | A1 4-319071 | 11/1992 |
| JP | A1 5-57664 | 3/1993 |
| JP | 5-131388 A | 5/1993 |
| JP | 7-24777 A | 1/1995 |
| JP | 2001-260068 A | 9/2001 |
| WO | WO 01/39933 A1 | 6/2001 |

* cited by examiner

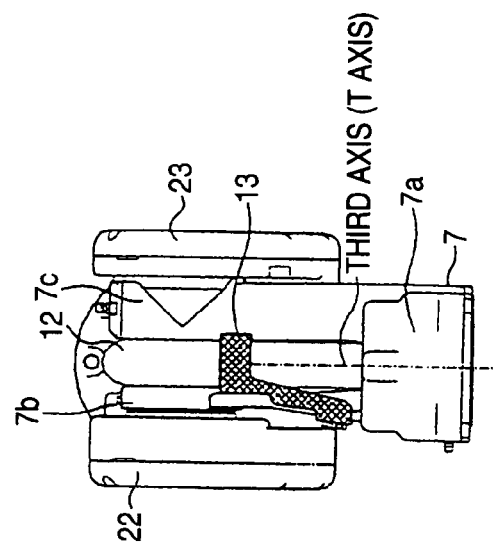
FIG. 7 (c)
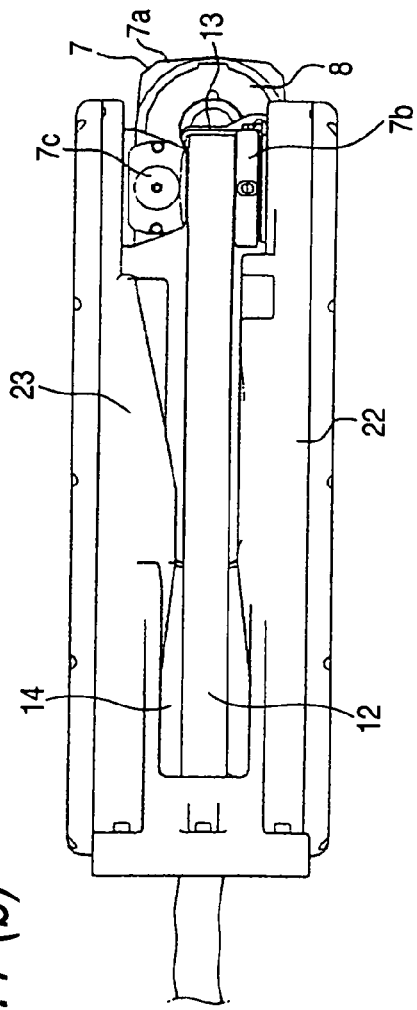
FIG. 7 (b)
FIG. 7 (a)
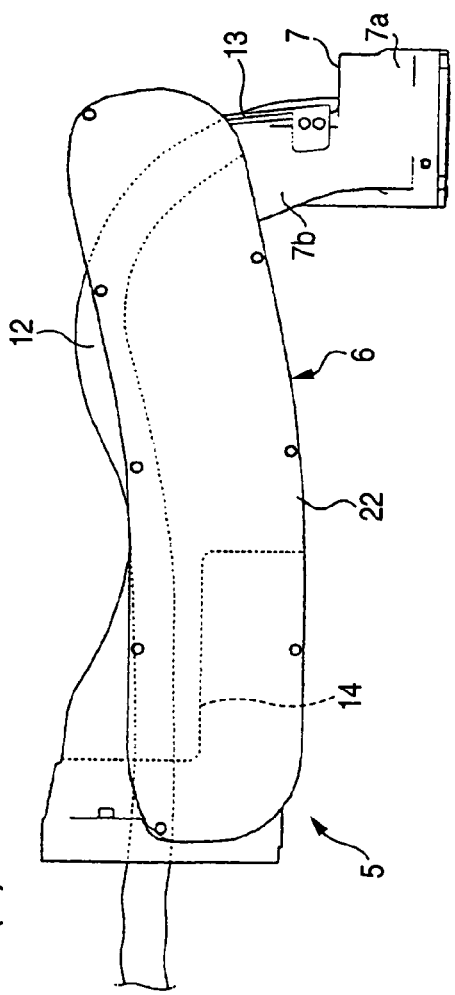

INDUSTRIAL ROBOT

TECHNICAL FIELD

This invention relates to an industrial robot, and more particularly to an arc-welding vertical multijoint robot.

BACKGROUND ART

Nowadays, arc welding robots each produced by attaching an arc welding torch to an end of a six-axis vertical multijoint robot are heavily used in many industrial fields. This six-axis vertical multijoint robot has a turning base (a first basic axis) adapted to turn around a vertical axis on a base stand, a lower arm (a second basic axis) attached to the turning base and adapted to frontwardly and rearwardly swing, an upper arm (a third arm) attached to an end of the lower arm and adapted to upwardly and downwardly swing, and a three-degree-of-freedom wrist portion (first to third wrist axes) attached to an end of the upper arm. In a case where the arc welding torch is attached to an end of the wrist portion, the arc welding torch can take a given attitude at a given position, so that arc welding can be freely performed.

FIG. 8 is a side view of a conventional arc welding robot.

In the figure, reference numeral 3 designates a lower arm, which is pivotally supported by a turning base (not shown) and frontwardly and rearwardly swings. Reference numeral 4 denotes an upper arm that is supported rotatably and pivotally around a U-axis (which is an axis perpendicular to a paper surface) at an end of the lower arm 3 and that swings upwardly and downwardly. Reference numeral 5 designates a wrist portion attached to an end of the upper arm.

The wrist portion 5 comprises a body 6 that rotates around an R-axis extending in the direction of length of the upper arm, a swinging element 7 that is pivotally supported at an end of the body 6 and that swings around a B-axis (which is an axis perpendicular to the paper surface) perpendicular to the R-axis, and a rotating element 8 that is provided at an end of the swinging element 7 and that rotates around a T-axis perpendicular to the B-axis.

Reference numeral 9 designates a welding torch fixed to the rotating portion 8 through a torch clamp 10. Reference numeral 11 denotes a wire feeding unit that is fixed onto the upper arm 2 and that draws out a welding wire from a wire storage unit (for example, a wire reel (not shown)) and pushes out the welding wire to the welding torch 9. Reference numeral 12 designates a conduit cable that connects the welding torch 9 and the wire feeding unit 11. The conduit cable 12 is produced by bundling a welding supply cable and a shielding gas supply hose around a protective tube for feeding the welding wire to the welding torch 9.

However, the conventional arc welding robot has a problem that when the swinging element 7 is caused swing around the B-axis so that the welding torch 9 is made to swing upwardly and downwardly with respect to the upper arm 4, the conduit cable 12 bends to thereby hinder the feeding of the welding wire. Also, the conventional arc welding robot has another problem that when the rotating element 8 is rotated around the T-axis, the conduit cable 12 twines around the wrist portion 5 and the upper arm 4.

To remedy these problems, the conduit cable 12 has been caused to extend over the upper arm 4 in such a way as to form a large arch thereover, as shown in FIG. 7, so that a motion of the welding torch 9 is absorbed by deformation of the arch. However, the conduit cable 12, which has formed a large arch, causes interference with a work and a peripheral device, so that the arch cannot needlessly be enlarged. Thus, complete solution of the problems has not been achieved.

DISCLOSURE OF INVENTION

Accordingly, the invention provides an industrial robot, wherein a cable or the like spanned between an end effector and an upper arm has less bending due to a motion of a wrist portion, wherein the cable or the like does not twine around the upper arm, and wherein the cable or the like does not interfere with a peripheral device.

To solve the problems, according to the invention, there is provided an industrial robot having a wrist portion provided at an end of an arm. The wrist portion has a body, attached to the end of the arm and adapted to rotate around a first axis extending in a direction of length of the arm, a swinging element, attached to an end of the body and adapted to swing around a second axis perpendicular to the first axis, and a rotating element attached to an end of the swinging element and adapted to rotate a third axis. In the industrial robot, a passage opening, from which a cable or the like for supplying power, a signal, or a material to an end effector attached to the rotating element is drawn out, is opened at a place, at which the body intersects with a center of the first axis.

Further, according to the invention, a motor and a reduction gear, which are used for driving the body, are provided in the arm concentrically with the first axis. The motor and the reduction gear are respectively a hollow shaft motor and a hollow shaft reduction gear, each of which has a hollow portion penetrating from anti-load side to load side and is adapted so that the cable or the like is drawn in from the anti-load side of the hollow portion and drawn out to the load side of the hollow portion.

Furthermore, according to the invention, a motor is provided in the arm by being off-centered from the first axis. A reduction gear, connected to the motor, for driving the body is provided in the arm concentrically with the first axis. The reduction gear is a hollow shaft reduction gear, which has a hollow portion penetrating from anti-load side to load side and is adapted so that the cable or the like is drawn in from the anti-load side of the hollow portion and drawn out to the load side of the hollow portion.

Further, according to the invention, there is provided an industrial robot having a wrist portion provided at an end of an arm. The wrist portion having a body, attached to the end of the arm and adapted to rotate around a first axis extending in a direction of length of the arm, a swinging element, attached to an end of the body and adapted to swing around a second axis perpendicular to the first axis, and a rotating element attached to an end of the swinging element and adapted to rotate a third axis. In this industrial robot, the body has two parts extending with the first axis to be shaped like a fork and swingably supports the swinging element by sandwiching the swinging element between the two parts shaped like prongs of the fork. A passage opening, from which a cable or the like for supplying power, a signal, or a material to an end effector attached to the rotating element is drawn out, is opened at a place, at which a bottom portion of the prong-like parts of the body intersects with a center of the first axis. The cable or the like drawn out from the passage opening is extended to the end effector through between the prong-like two parts.

Furthermore, according to the invention, the swinging element has prong-like parts extending in parallel with the third axis. The cable or the like extends to the end effector through between the prong-like two parts of the swinging element. A restraining piece for restraining the cable from sticking out from between the prong-like two parts is provided between the prong-like parts of the swinging element.

Further, according to the invention, an ingress opening is opened in a side surface of the arm. The cable or the like is drawn into an inside of the arm from the ingress opening and extended from the inside of the arm to the body along the first axis.

Furthermore, according to the invention, the rotating element has a cylindrical space that penetrates from a front end to a rear end thereof and is provided concentrically with the third axis. The end effector is provided by being inserted into the space.

Further, according to the invention, a first motor for driving the body is provided in the arm concentrically with the first axis. A second motor for driving the swinging element, and a third motor for driving the rotating element are provided in the body in such a way as to perpendicular to the first axis. Power of the second motor and power of the third motor are transmitted to the swinging element and the rotating element through a belt pulley mechanism disposed between the prong-like two parts of the body.

Furthermore, according to the invention, a power/signal line for driving each of the second motor and the third motor is provided at a place off-centered from the center of the first axis serving and extended from the inside of the arm to an inside of the body.

Further, according to the invention, the end effector is an arc welding torch. The cable or the like is a conduit cable.

Furthermore, according to the invention, a wire feeding unit for feeding a welding wire to the torch is attached to a rear of the arm.

Further, according to the invention, the wire feeding unit is attached in a direction in which the welding wire is fed in parallel with the first axis.

Furthermore, according to the invention, the cable or the like is protected by being covered with a protective tube that is produced by coating a coil spring with a resin.

BRIEF DESCRIPTION OF DRAWINGS

FIG. 7 is a trihedral view of an industrial robot, which shows a third embodiment of the invention.

BEST MODE FOR CARRYING OUT THE INVENTION

Hereinafter, embodiments of the invention are described with reference to the accompanying drawings.

Figure 1:
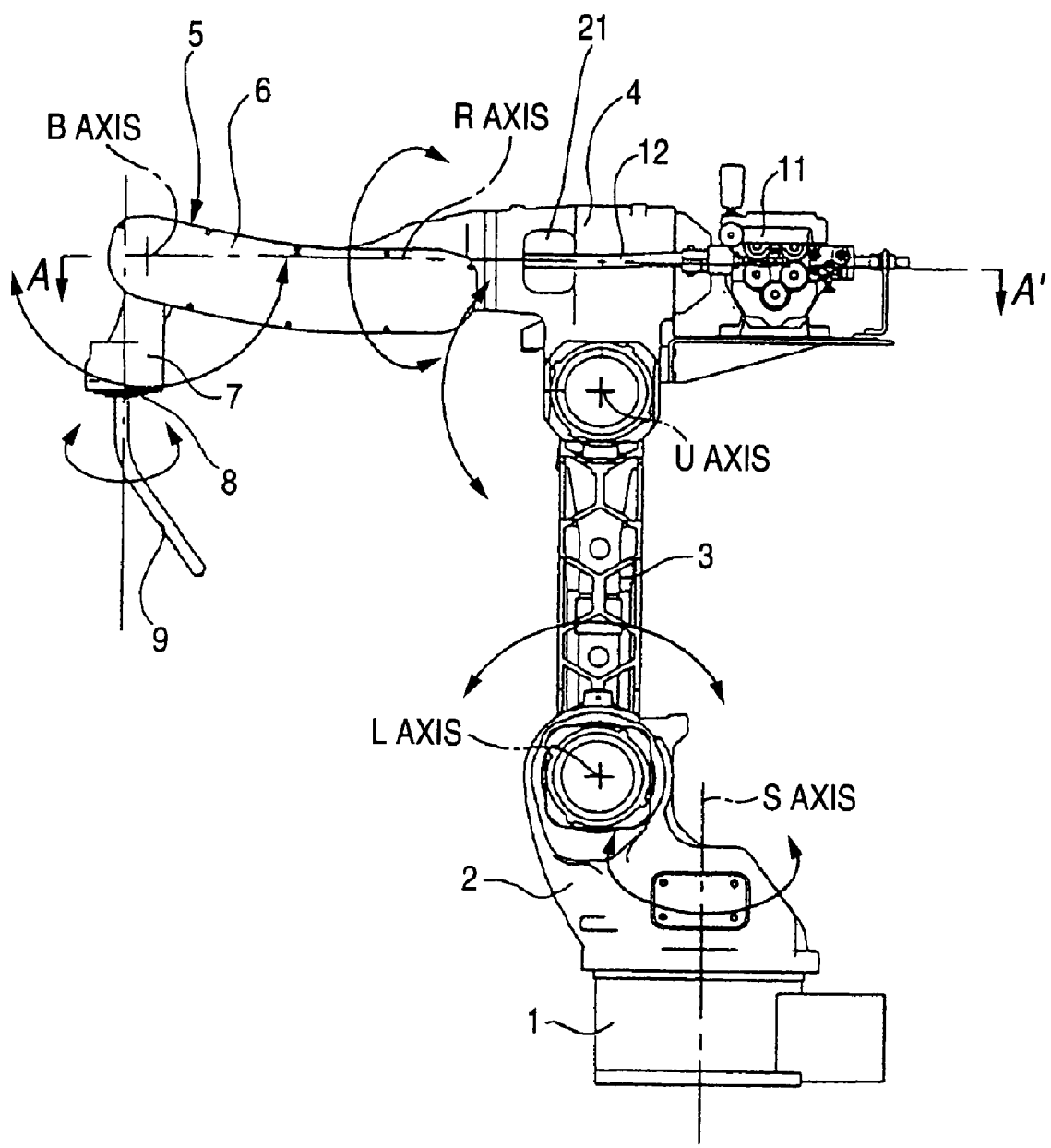
FIG. 1 is a side view of an industrial robot, which shows a first embodiment of the invention.

FIG. 1 is a side view of an industrial robot, which shows a first embodiment of the invention.

In the figure, reference numeral 1 designates a base stand of an industrial robot. A turning base 2 is mounted on the base stand 1 in such a way as to be turnable around a vertical axis (an S-axis), A lower arm 3 is supported on the turning base 2 in such a manner as to be turnable around a horizontal axis (an L-axis), and swings in a front-rear direction. An upper arm 4 is supported on the top of the lower arm 3 in such a way as to be turnable around a horizontal axis (a U-axis), and swings in an up-down direction.

Reference numeral 5 designates a wrist portion attached to an end of the upper arm 4. The wrist portion 5 comprises a body 6 attached thereto in such a manner as to be rotatable around a central axis (an R-axis: a first wrist axis) extending in the direction of length of the upper arm 4, a swinging element 7 that is pivotally supported at an end of the body 6 and swings around an axis perpendicular to the R-axis (a B-axis: a second wrist axis), and a rotating element 8 that is provided at an end of the swinging element 7 and rotates around a rotation axis (a T-axis: a third wrist axis).

Reference numeral 9 designates a welding torch attached to the rotating element 8, and reference numeral 11 denotes a wire feeding unit fixed to a rear end of the upper arm 4. A welding wire is supplied from a wire reel (not shown) to the wire feeding unit 11, which feeds the welding wire through a conduit cable 12 to the welding torch 9. The conduit cable 12 extends along a side surface of the upper arm 4 in parallel with the R-axis and drawn into the inside thereof from an ingress opening 21 opened in the side surface thereof. Incidentally, a route of the conduit cable 12 from the inside of the upper arm 4 to the welding torch 9 will be described later.

Further, the conduit cable 12 is protected by being let through a protective tube produced by coating a coil spring with a resin.

Figure 2:
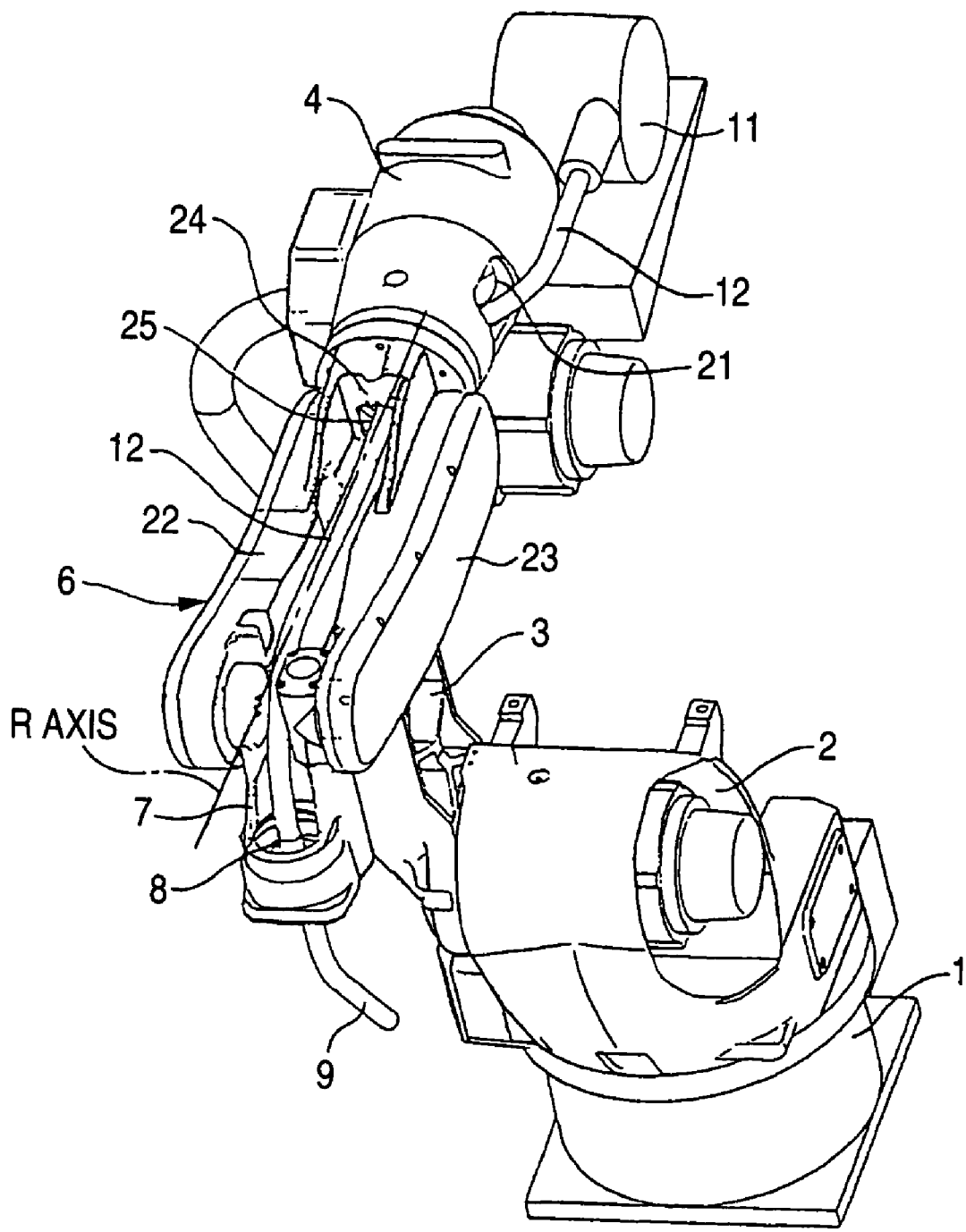
FIG. 2 is a stereograph of the industrial robot shown in FIG. 1.

FIG. 2 is a stereograph of the industrial robot shown in FIG. 1.

The body 6 of the wrist portion 5 is formed having a nearly U-shape in plan view, and has two members 22 and 23 that extend in parallel with the R-axis and is shaped like a fork. The swinging element 7 is sandwiched between the members 22 and 23 and supported in a center impeller manner. The conduit cable 12 having entered the inside of the upper arm 4 from the ingress opening 21 goes out of the passage opening 25 opened in a U-shaped bottom portion 24 of the body 6 again and extends to the swinging element 7 through a space between the members 22 and 23. The passage opening 25 is an aperture centered around the R-axis, and the conduit cable 12 is disposed to extend from the passage opening 25 toward the swinging element 7 along the R-axis (so that the central axis of the conduit cable 12 coincides with the R-axis).

Figure 3:
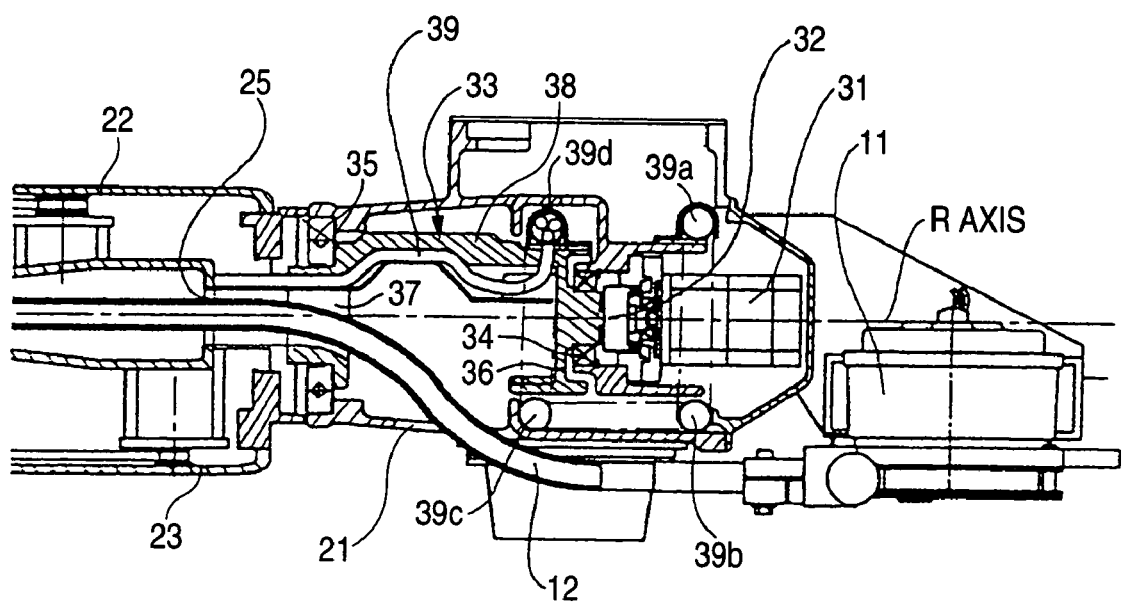
FIG. 3 is a plan sectional view of an upper arm of the industrial robot shown in FIG. 1.

FIG. 3 is a plan sectional view of the upper arm 4 of the industrial robot shown in FIG. 1, which is taken on line A-A' of FIG. 1.

Figure 4:
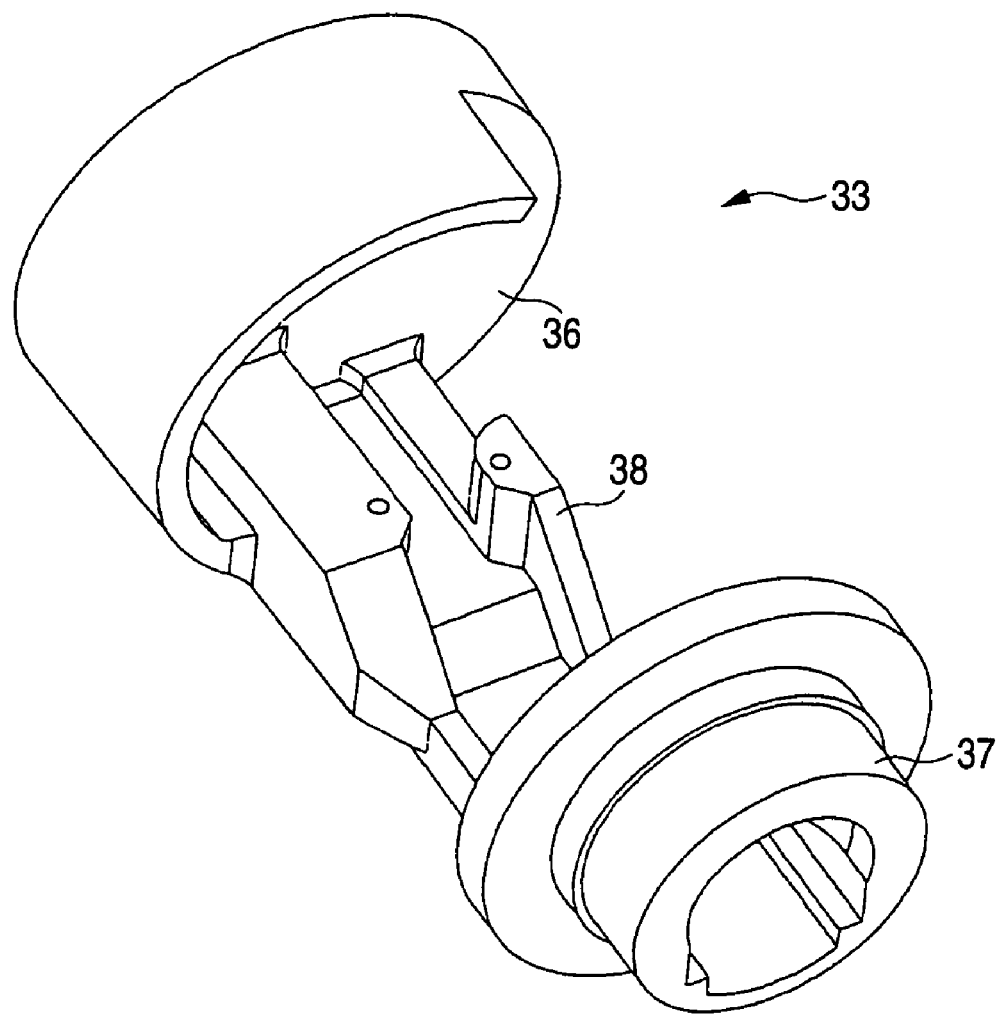
FIG. 4 is a stereograph of an intermediate shaft.

In the figure, reference numeral 31 designates a motor mounted in the upper arm 4 by making the central axis of the rotating shaft thereof coincide with the R-axis, that is, concentrically with the R-axis. The motor 31 rotation-drives the body 6 of the wrist portion 5 around the R-axis through a reduction gear 32 and an intermediate shaft 33. The intermediate shaft 33 is rotatably supported in the upper arm 4 by bearings 34 and 35. Further, the intermediate shaft 33 comprises an annular portion 36 supported by the bearing 34 and connected to the reduction gear 32, a hollow cylindrical portion 37 supported by the bearing 35 and connected to the body 6, and a connection portion 38, which is provided at a place offset from the center of rotation (the R-axis). The intermediate shaft 33 is shaped like a crankshaft as a whole (see FIG. 4).

Reference numeral 39 designates an inside wire. The inside wire 39 is a power line equipped in the body 6 and used for driving a motor (to be described later), which drives the swinging element 7 and the rotating element 8. The inside wire 39 is drawn into the upper arm 4 from the lower arm 3 and clamped at a point 39a in the upper arm 4. The inside wire 39 extends from the point 39a to a point 39b by forming an arc around the R-axis to thereby form a toric portion. Moreover, the inside wire 39 extends from the point 39b to a point 39c by forming a U-shaped folding portion. The inside wire 39 extends from the point 39c to a point 39d by forming a toric portion around the R-axis again, and is clamped at the point 39c by the annular portion 36 of the intermediate shaft 33. Incidentally, the applicant of the present application retains a Utility Model Right for the structure for holding the inside wire 39 from the point 39a to the point 39d, as Japanese Utility Model No. 2117576 (JP-UM-B-7-39575).

The inside wire 39 extends from the point 39d along the connection portion 38 of the intermediate shaft 33 (although omitted in drawing, the inside wire 39 is appropriately and firmly bound to the connection portion 38) and enters the body 6 through a groove provided in an outer periphery of the hollow portion by bypassing the center (the R-axis) of the hollow cylindrical portion 37 of the intermediate shaft 33.

The conduit cable 12 enters the upper arm 4 from the ingress opening 21 opened in the side surface thereof and goes out from the passage opening 25 of the body 6 through the central hollow portion of the hollow cylindrical portion 37 of the intermediate shaft 33. The hollow portion and the passage opening are cylinders centered around the R-axis, so that the conduit cable 12 is straightly drawn out along the R-axis to the outside.

The conduit cable 12 is centered around the R-axis, while the inside wire 39 is located at a place off-centered from the R-axis. Therefore, when the body 6 rotates around the R-axis, the inside wire 39 goes around the conduit cable 12 like a satellite. Consequently, no interference occurs between the inside wire 39 and the conduit cable 12.

Incidentally, the interference between the conduit cable 12 and the connection portion 38 of the intermediate shaft 33 during rotation of the intermediate shaft 33 around the R-axis comes in question. However, a slight bend of the conduit cable 12 at contact between the conduit cable 12 and the connection portion 38 is tolerable. Thus, the intermediate shaft 33 can be rotated ±180° from the position illustrated in this figure. Consequently, this interference is insignificant from a practical standpoint.

Figure 5:
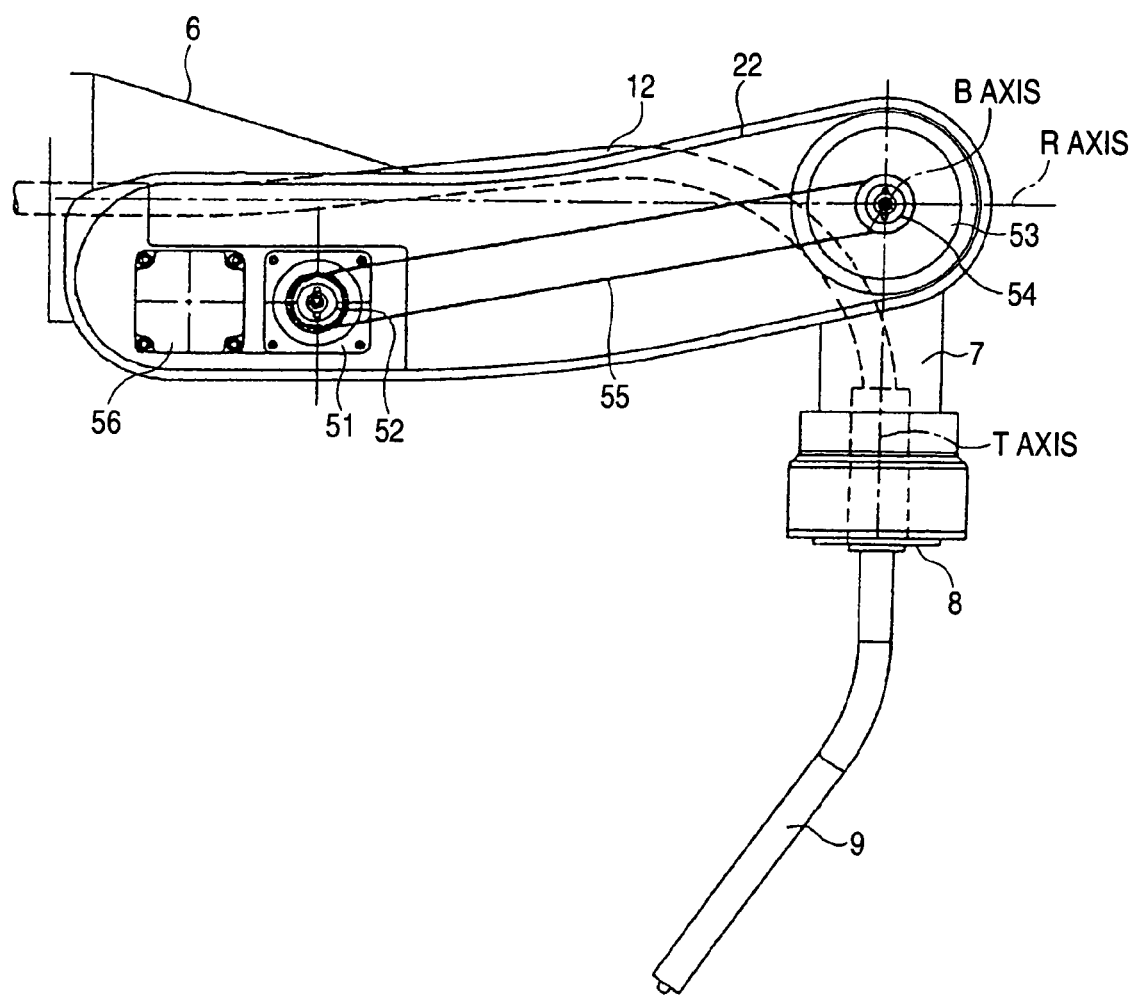
FIG. 5 is a side view of a wrist portion of an industrial robot, which shows a second embodiment of the invention.

FIG. 5 is a side view of a wrist portion of an industrial robot, which shows a second embodiment of the invention. For convenience of description, the wrist portion is illustrated by removing a cover for the right-side surface of the body 6 of the wrist portion 5 so as to display an internal mechanism.

In the figure, reference numeral 51 designates a motor for driving the swinging element 7. The motor 51 is mounted in the body 6 sideways, that is, in such a way as to be perpendicular to the R-axis, and as to be parallel with the B-axis. A pulley 52 is attached to an output shaft of the motor 51. Reference numeral 53 designates a reduction gear, which is connected to the swinging element 7 and attached to an end of the body 6. A pulley 54 is attached to an input shaft of the reduction gear 53. A timing belt 55 is wound around the pulleys 54 and 52. That is, power of the motor 51 is transmitted to the reduction gear 53 through a belt pulley mechanism thereby to rotate-drive the swinging element 7 around the B-axis.

Reference numeral 56 denotes a motor for driving the rotating element 8. Similarly to the motor 51, the motor 56 is mounted in the body 6 sideways. Power of the motor 56 drives the rotating element 8 through another belt pulley (not shown) disposed at the left side (the rear side of a paper surface).

Further, the motor 51 and the motor 56 are mounted at places off-centered downwardly from the R-axis. This is employed for preventing the interference between these motors and the conduit cable 12 extending along the R-axis.

Figure 6:
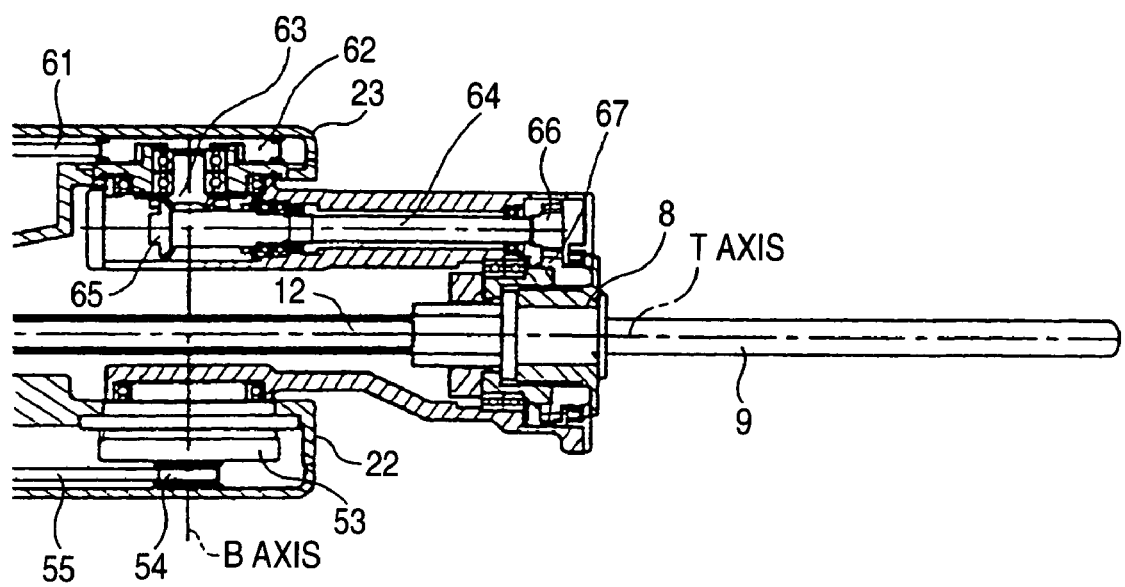
FIG. 6 is a plan sectional view showing the internal mechanism of the wrist portion shown in FIG. 5.
Figure 8:
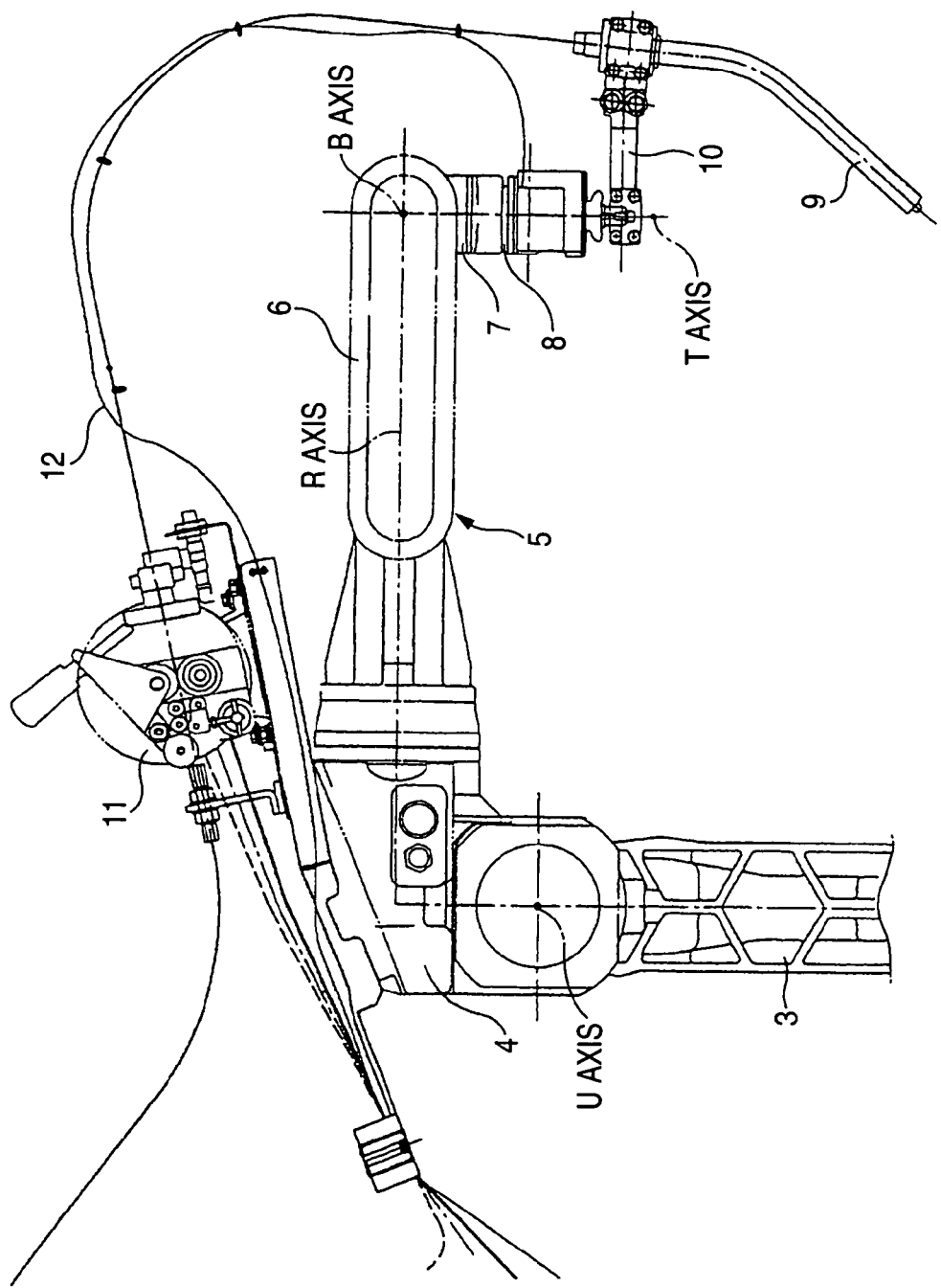
FIG. 8 is a side view of a conventional industrial robot, which shows prior art.

FIG. 6 is a plan sectional view showing the internal mechanism provided at an end of the wrist portion of the industrial robot shown in FIG. 5. In the case shown in FIG. 6, the swinging element 7 is rotated around the B-axis 90 degrees and brought into a horizontal attitude, that is, an attitude in which the R-axis and the T-axis coincide with each other. Incidentally, constituent elements, which are common to this figure and FIG. 5, are designated by same reference character in these figures, so that the description of such constituent elements is omitted.

Reference numeral 61 designates a belt that transmit power of a rotating element driving motor (which corresponds to the motor 56 and is not shown in FIG. 6) to a pulley 62. A bevel gear 63 is attached to the pulley 62. Reference numeral 64 denotes a transmission shaft axially supported by the swinging element 7 in parallel with the T-axis. Bevel gears 65 and 66 are attached to both ends of the transmission shaft, respectively. The bevel gear 65 engages with the bevel gear 63. Reference numeral 67 designates a bevel gear attached to the rotating element 8. The bevel gear 67 meshes with the bevel gear 66. Thus, the power of the rotating element driving motor is transmitted to the rotating element 8.

The rotating element 8 has a cylindrical hollow portion centered around the T-axis. The welding torch 9 penetrates through the hollow portion. The conduit cable 12 is connected to an end portion of the welding torch 9 passed through the rotating element 8. The conduit cable 12 is disposed concentrically with the R-axis in the space between the members 22 and 23 of the body 6 shaped like a fork.

Further, a swinging element driving belt pulley mechanism and a rotating element driving belt pulley mechanism are disposed in the member 22 and the member 23, respectively.

FIG. 7 is a trihedral view of an industrial robot, which shows a third embodiment of the invention, and (a) is a front view thereof, (b) is a plan view thereof, and (c) is a right side view thereof. The basic configuration thereof is the same as those of the first and second embodiments shown in FIGS. 1 to 6. Constituent elements common thereto are designated by same reference characters, and the description of such constituent elements is omitted.

The swinging element 7 has a main body 7a supporting the rotating element 8, and two parts 7b and 7c, which are provided on the left and right sides of the main body 7a (as viewed in the right side view thereof) and extend in parallel with a third axis (the T-axis), that is, a rotation center axis of the rotating element 8, and is shaped like a fork. Ends of the parts 7b and 7c are respectively and rotatably supported by the members 22 and 23, which are provided on the left and right sides of the body 6, and support the swinging element 7 in a center impeller manner. The conduit cable 12 extends to the rotating element 8 (and further to the welding torch attached to an end of this element) through the space between the members 22 and 23 and the space between the parts 7a and 7b.

Reference numeral 13 designates a cable support fixed to the part 7b. The cable support 13 blocks the space between the parts 7b and 7c and functions as a restraining piece for restraining the conduit cable 12 from sticking out from between the parts 7b and 7c.

A connecting piece 14 for connecting the members 22 and 23 of the body 6 is provided therebetween and strains the conduit cable 12 from hanging down from the body 6.

Thus, deformation of the conduit cable 12 is restrained by the cable support 13 and the connecting piece 14. Consequently, even when the swinging element 7 or the rotating element 8 is caused to largely operate, the conduit cable 12 neither largely sticks out form the wrist 5 nor interferes with a work and a peripheral device. Furthermore, when the swinging element 7 is flung directly above (the swinging element 7 is swung 180° from the state illustrated in FIG. 7), the conduit cable 12 deforms in such a way as to stick out on the body 6, the cable support 13 has the effect of suppressing this deformation.

Although the swinging element 7 of the wrist portion 5 is axis-supported at the end of the body 6 in a center impeller manner in each of the aforementioned embodiments, the swinging element 7 may be supported in a cantilevered manner. That is, the robot may choose a structure in which the swinging element 7 is supported by the member 22 in a cantilevered manner by removing one 23 of the two members 22 and 23 of the body 6 shown in FIG. 2.

Further, although the conduit cable 12 is drawn into the upper arm 4 from the side surface in each of the embodiments, the conduit cable 12 can be straightly extended along the R-axis from the rear end of the upper arm to the welding torch by configuring the robot as the following first and second modifications.

(First Modification)

What are called a hollow shaft motor and a hollow shaft reduction gear, each of which has a hollow portion penetrating from anti-load side to load side, are employed as the motor 31 and the reduction gear 32, respectively, so that the conduit cable 12 extends straightly (along the R-axis) in the intermediate shaft 33 through the hollow shaft of the motor 31 and the hollow shaft of the reduction gear 32. At that time, preferably, the wire feeding unit 11 is attached thereto so that a direction, in which the welding wire is fed, coincides with the R-axis. This structure can be expected to has the effect of reducing welding wire feeding resistance, because the bend of the conduit cable is small, as compared with the case of drawing the conduit cable 12 into the upper arm 4 from the side surface.

(Second Modification)

The hollow shaft motor used in the first modification is costly. Therefore, the robot may be adapted so that only the reduction gear 32 is changed to the hollow shaft reduction gear, and that the motor 31 is off-centered from the R-axis in parallel therewith and connected to the reduction gear 32 through the belt pulley mechanism. In this case, the conduit cable 12 enters the upper arm 4 from the rear end thereof along the R-axis and passes along the side of the motor and then enters the hollow shaft of the reduction gear 32.

Further, although the arc welding robot has been taken up in the description of the embodiments, the invention is not limited to the arc welding robot. The invention can be applied to all of uses, such as painting, sealing, polishing, and handling. That is, the end effector may be a painting spray gun, a sealing nozzle, a polishing tool, or a mechanical hand. The cable or the like may be a painting hose, a sealing material supply hose, a pneumatic tool driving air hose, a power-tool driving power line or the like.

Incidentally, in the description of arrangement of the conduit cable 12, the expressions "concentrically with the R-axis" and "in parallel with the R-axis" have been used. However, these expressions do not require geometrical exactness. Needless to say, some margin of error can be allowed within a range in which the object and advantages of the invention can be achieved.

As described above, the industrial robot according to the invention has the effect of preventing the interference between the peripheral device or the like and the cable or the like, because the cable or the like for the end effector is provided along the major axis of the upper arm thereof. Because the interference does not occur, occurrences of abrasion of the cable or the like and damage, such as breaking, of the wire, can be averted, so that the robot according to the invention also has the effect of increasing the life of the cable or the like. Further, in the upper arm and the wrist portion, the cable or the like is placed in such a way as to coincide with the center axis of rotation of the wrist portion, while the inside wire for driving the wrist is off-centered from the central axis of rotation thereof. Thus, the inside wire rotates like a satellite around the outer circumference of the cable or the like. Therefore, the robot of the invention has the effect of preventing the interference between the inside wire and the cable or the like. Furthermore, even when the wrist portion rotates around the major axis thereof, the cable or the like is only twisted and follows the rotation of the wrist portion, so that no bend of the cable or the like occurs. Thus, change in the feeding resistance of the welding wire, which is fed through the inside of the cable or the like, does not occur. Consequently, the robot of the invention has the effects of stably feeding the welding wire and extremely enhancing welding quality.

INDUSTRIAL APPLICABILITY

The invention is useful as an industrial robot, and more particularly as an arc-welding vertical multijoint robot.

The invention claimed is:

1. An industrial robot comprising:
   a wrist portion provided at an end of an arm,
   the wrist portion including;
   a body, attached to the end of the arm and rotate rotates around a first axis extending in a direction of length of the arm;
   a swinging element, attached to an end of the body and swings around a second axis perpendicular to the first axis; and
   a rotating element attached to an end of the swinging element that rotates around a third axis along the length of the swinging element,
   the body having a passage from which a cable for supplying power, a signal, or a material to an end effector attached to the rotating element is drawn out,
   the passage having an opening along the first axis.

2. The industrial robot according to claim 1, further comprising:
   a motor and a reduction gear, which are used for driving the body, provided in the arm concentrically with the first axis, wherein
   the motor and the reduction gear are respectively a hollow shaft motor and a hollow shaft reduction gear, each of which has a hollow portion penetrating from anti-load side to load side such that the cable is drawn in from the anti-load side of the hollow portion and drawn out to the load side of the hollow portion.

3. An industrial robot comprising:
   a wrist portion provided at an end of an arm,
   the wrist portion including;
   a body, attached to the end of the arm and rotates around a first axis extending in a direction of length of the arm;
   a swinging element, attached to an end of the body and swings around a second axis perpendicular to the first axis; and a rotating element attached to an end of the swinging element and rotates around a third axis, wherein the body has two parts extending with the first axis and the body having a first end and a second end, at the first end, the two parts of the body being attached to each other and at the second end the two parts being detached from each other to define a portion that swingably supports the swinging element by sandwiching the swinging element between the two parts;

the body having a passage from which a cable for supplying power, a signal, or a material to an end effector attached to the rotating element is drawn out, the passage having an opening along the first axis; and the cable drawn out from the passage opening is extended to the end effector through between the two parts.

4. The industrial robot according to any one of claims 1, 2, or 3 wherein an ingress opening is opened in a side surface of the arm; and the cable or the like is drawn into an inside of the arm from the ingress opening and extended from the inside of the arm to the body along the first axis.

5. The industrial robot according to any one of claims 1, 2, or 3, wherein the rotating element has a cylindrical space that penetrates from two opposite ends thereof and is provided concentrically with the third axis; and the end effector is provided by being inserted into the space.

6. The industrial robot according to claim 1, wherein the body includes two members extending along the first axis, the body having a front portion where the two members are detached and a bottom portion where the two members are attached to each other, an opening being provided at the bottom portion, a pathway being provided between the two members at the detached portion, and the cable is flexible so that it can be positioned at various positions either inside or outside the pathway during the swinging of the swinging element.

7. The industrial robot according to claim 6, wherein throughout a range from a portion connected with the arm to an end of the body, the cable is horizontally provided between the two members, the pathway being larger than a diameter of the cable.

8. An industrial robot comprising:

a wrist portion provided at an end of an arm, the wrist portion including;

a body, attached to the end of the arm and adapted to rotate around a first axis extending in a direction of length of the arm;

a swinging element, attached to an end of the body and adapted to swing around a second axis perpendicular to the first axis; and a rotating element attached to an end of the swinging element and adapted to rotate around a third axis along the length of the swinging element, wherein a passage is provided, from which a cable for supplying power, a signal, or a material to an end effector attached to the rotating element is drawn out, the passage having an opening along the first axis, the body includes a member extending along the first axis, and the swinging element is cantilevered by the member.

\* \* \* \* \*